April 15, 1952  P. G. VON HILDEBRANDT  2,592,983
APPARATUS FOR SEPARATING COOKING LIQUOR FROM PULP
Original Filed July 2, 1945  4 Sheets-Sheet 1
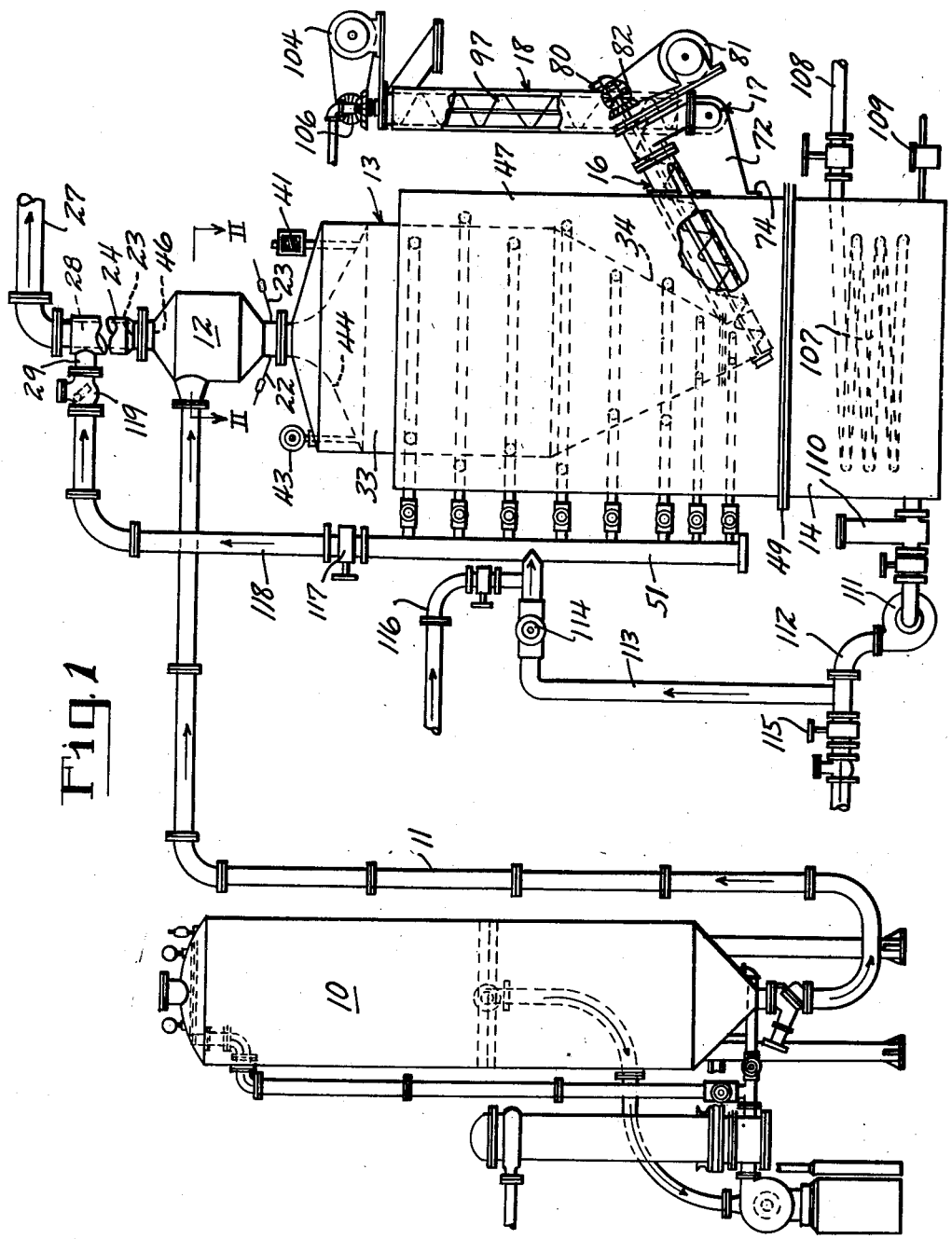
INVENTOR.
Paul G. von Hildebrandt
BY
Henry L. Jennings
Attorney April 15, 1952    P. G. VON HILDEBRANDT    2,592,983
APPARATUS FOR SEPARATING COOKING LIQUOR FROM PULP
Original Filed July 2, 1945      4 Sheets—Sheet 2
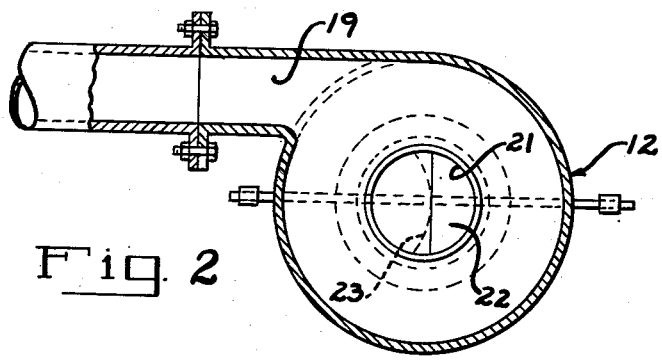
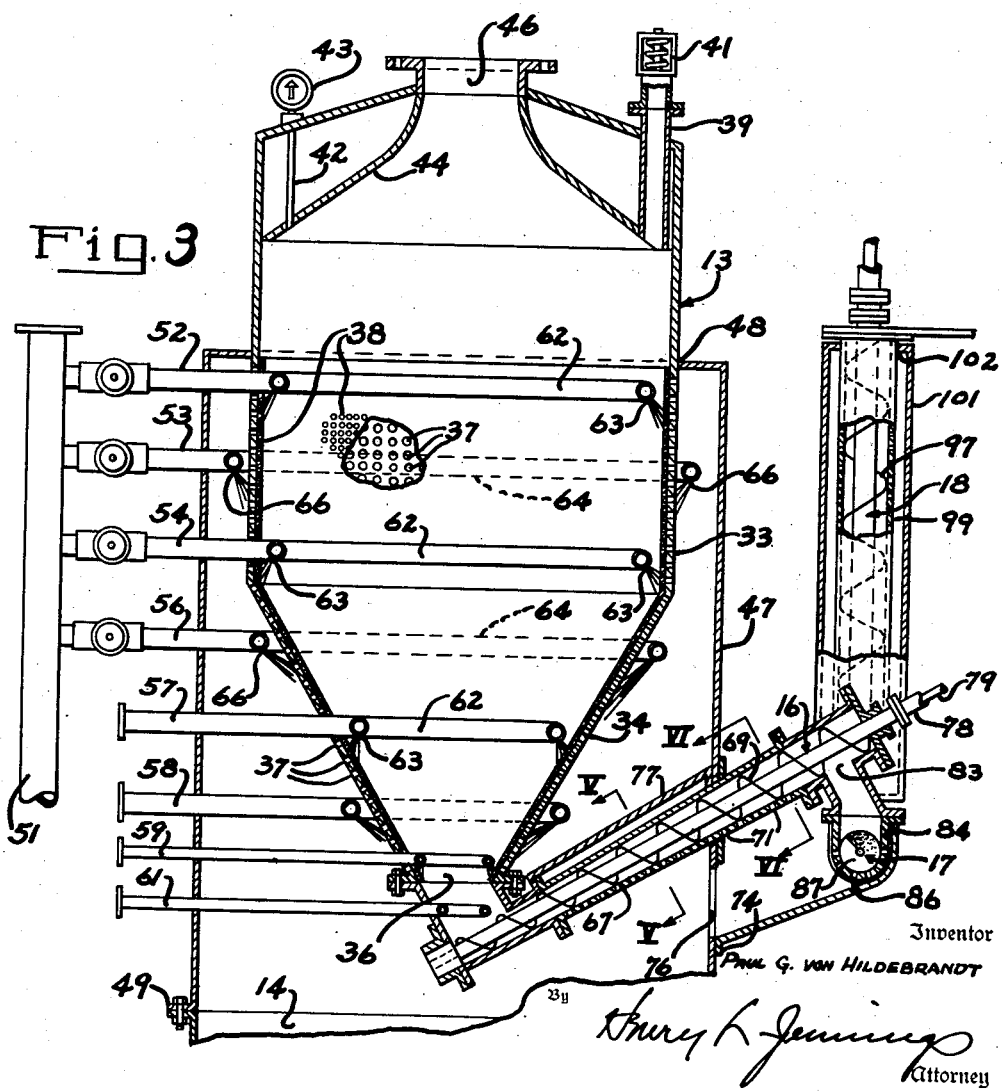

April 15, 1952     P. G. VON HILDEBRANDT     2,592,983
APPARATUS FOR SEPARATING COOKING LIQUOR FROM PULP
Original Filed July 2, 1945     4 Sheets-Sheet 3

INVENTOR.
BY Paul G. von Hildebrandt
Attorney

April 15, 1952   P. G. VON HILDEBRANDT   2,592,983
APPARATUS FOR SEPARATING COOKING LIQUOR FROM PULP
Original Filed July 2, 1945   4 Sheets-Sheet 4
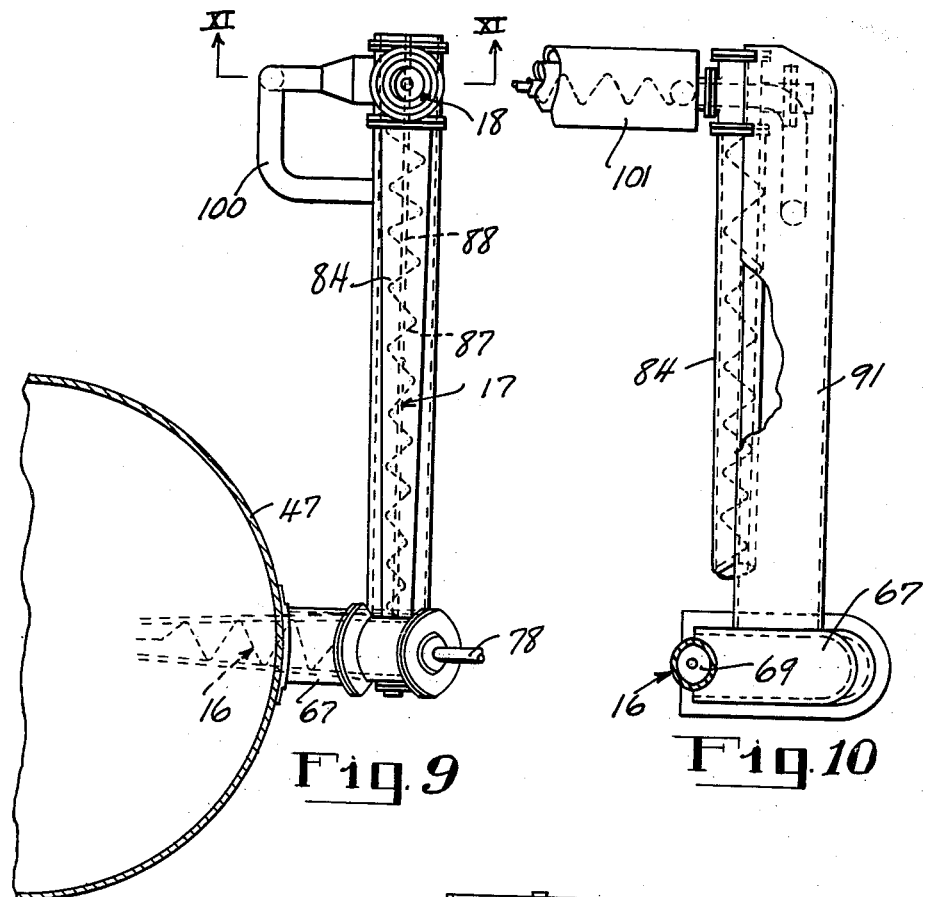
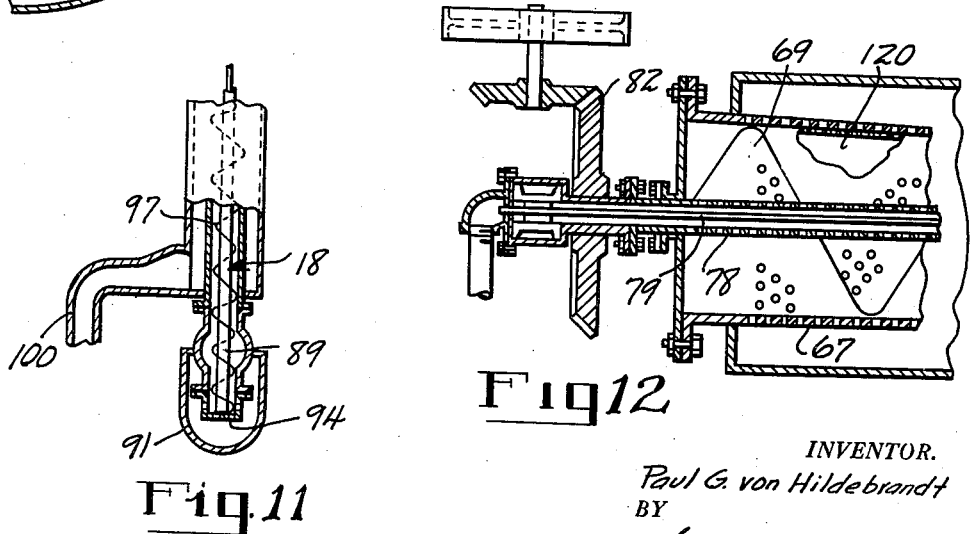
INVENTOR.
Paul G. von Hildebrandt
BY
Henry L. Jennings
Attorney Patented Apr. 15, 1952

2,592,983

UNITED STATES PATENT OFFICE 2,592,983

APPARATUS FOR SEPARATING COOKING LIQUOR FROM PULP

Paul G. von Hildebrandt, Portland, Oreg.

Original application July 2, 1945, Serial No. 602,898. Divided and this application July 17, 1947, Serial No. 761,585

12 Claims. (Cl. 92—7)

This application is a division of my previously filed application, Serial No. 602,898, filed July 2, 1945, now Patent No. 2,534,324.

This invention relates to apparatus for separating pulp from cooking liquor in the manufacture of paper. A principal object of the invention is to provide apparatus of the character designated by means of which the major portion of the cooking liquor is recovered without water dilution.

A further object of my invention is to provide apparatus in which the cooking liquor is separated from the pulp by passing currents of steam through the pulp, thereby maintaining the resins and lignins in a fluid condition.

A still further object of my invention is to provide apparatus in which the cooking liquor is separated from pulp with a minimum of water dilution, thereby reducing foaming and the amount of heat required for evaporating the black liquor down for subsequent burning.

A still further object of my invention is to provide apparatus for separating pulp from cooking liquor, which includes means for employing steam as the separating agent.

A more specific object of my invention is the provision of apparatus for separating cooking liquor from pulp, which includes a blow tank through which the pulp moves continuously, having the major portion of the liquor separated therefrom while in transit, without the use of wash water, thereby minimizing foaming and the loss of pulp with the foam.

While not limited thereto, my improved process will be described in connection with the manufacture of paper by the sulphate or soda process. It will be apparent, however, from the description which is to follow that it is equally applicable for use in separating pulp from cooking liquor in the sulphite process.

Heretofore, in the manufacture of paper by the sulphate or soda process, when the mixture of black liquor and pulp is discharged from the digestors, it is usually passed to a diffuser or to a pulp washing machine where the black liquor is separated from the pulp. In discharging the pulp from the digestors difficulties have been encountered in the loss of pulp with the escaping steam. In the diffuser type of separator, the black liquor is drained through a perforated bottom on which the pulp is retained, and weak liquor is supplied to the mass of pulp to displace and wash the stronger black liquor from the fibers until the liquor has reached its minimum density. Hot water is then used to continue the washing of the liquor from the fibers. In the vacuum type of pulp washing machine, there is a rotary, perforated metal cylinder covered with a fine mesh wire screen which is partly submerged and rotated in a mixture of pulp and black liquor. The inner side of the cylinder is connected to a suction device and during a part of each revolution a layer of pulp is drawn onto the screen and the black liquor is filtered out. During a further part of the revolution, hot water showers drench the mat of fiber on the drum and this wash water is also drawn through the screen. The mat of pulp is then washed off the screen with powerful jets of water into a stock chest.

With either of these methods, a great deal of water is employed and the black liquor is greatly diluted. As is also well known, it is the practice to evaporate the black liquor down to a consistency where it can be economically employed as a fuel and then it is burned in the boiler furnaces of the mill to supply heat and to recover the chemicals used in cooking the wood chips. The heat required to evaporate the black liquor down is expensive and it is the principal object of my invention to provide a process and apparatus which will recover the black liquor with a minimum of dilution.

In accordance with my invention, I provide a blow tank of the necessary capacity to take care of the pulp as it is cooked. The digestors are discharged into this blow tank through a cyclone having a weighted valve in the bottom through which the pulp passes downwardly into the tank. The tank is provided with a perforated screen conical bottom through which the black liquor drains into a storage tank. At the lower end of the conical bottom, is disposed a screw conveyor which removes the pulp as it reaches the conical bottom of the blow tank. The conveyor is provided with a perforated trough through which the liquor continues to drain. While in the conveyor, steam is diffused through the pulp which maintains the lignins and resins in a liquid condition so that they are expelled from the pulp responsive to the squeezing action of the conveyor screw. This is very important in separating the black liquor from the knots which in practice absorb the greater proportion of the black liquor.

A plurality of screw conveyors are preferably employed, each of which has an increasing diameter from its inlet to its discharge end thereby to allow for the expansion of the pulp as it is separated from the black liquor, and to provide for better diffusion of the steam through the pulp. Other features of my invention consist of means to prevent the carrying over of pulp with the steam from the black liquor as it is discharged from the digestor and in the various details of construction and arrangement of parts hereinafter described.

Apparatus embodying features of my invention is illustrated in the accompanying drawing, in which:

Fig. 1 is an assembly view showing the apparatus for carrying out my invention;

Fig. 2 is a detailed sectional view of the cyclone through which the pulp-black liquor mixture is blown into the blow tank, and taken along the line II—II of Fig. 1;

Fig. 3 is a sectional view of the blow tank, and the screw conveyor connecting with the lower end of the tank;

Fig. 9 is a plan view of the screw conveyers;

Fig. 10 is a side elevation thereof with parts broken away;

Fig. 11 is a sectional view taken along the line XI—XI of Fig. 9; and

Fig. 12 is a sectional view typical of the three conveyers showing the means for admitting steam to the pulp.

Figure 4:
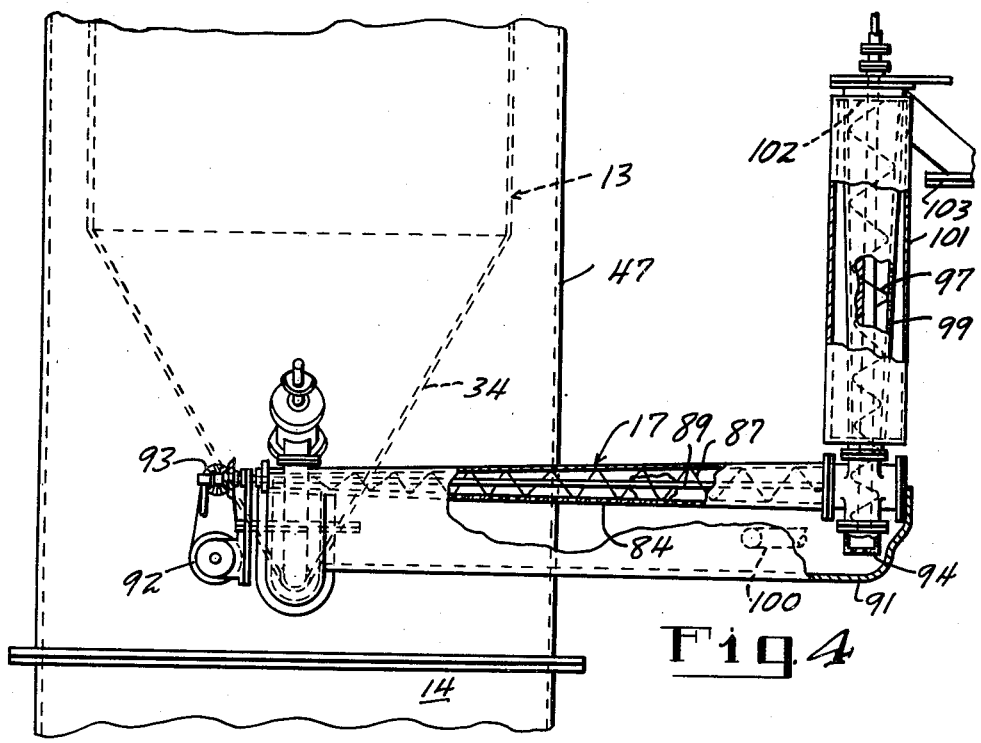
Fig. 4 is a view taken at right angles to Fig. 3 and showing one of the screw conveyors in section.
Figure 8:
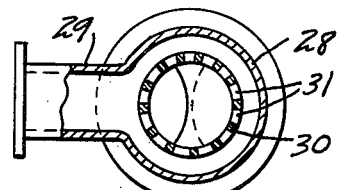
Fig. 8 is a sectional view taken along the line VIII—VIII of Fig. 7.

Referring now to the drawings for a better understanding of my invention, I show in Fig. 1 a paper mill installation comprising a digester 10, a blow down line 11, connected to the digestor, and discharging into a cyclone 12. From the cyclone 12, the black liquor and pulp pass downwardly with a whirling motion into my improved blow tank 13 wherein the black liquor is separated and flows into a storage tank 14. The pulp is removed from the blow tank by means of a system of screw conveyors 16, 17 and 18.

The cyclone 12, is provided with a tangential inlet 19, and a bottom outlet 21, in which are located weighted trap valves 22 and 23 which open responsive to the weight of the mixture of pulp and black liquor on them allowing it to pass downwardly through the discharge opening 21 into the blow tank 13.

Figure 7:
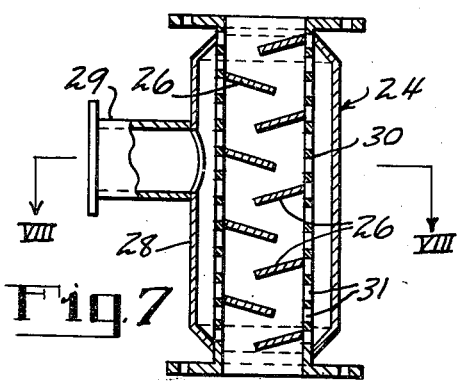
Fig. 7 is a sectional view showing the manifold and baffle arrangement through which the steam from the black liquor is discharged.

Mounted above the cylone 12 is a baffle chamber 24, shown in detail in Fig. 7. The baffle chamber 24 has its wall 30 provided with a multiplicity of downwardly inclined overlapping baffles 26. It is open at the bottom and top as shown in Fig. 7 and has connected to the upper end a discharge conduit 27. Steam from the pulp and black liquor being discharged from the digestor 10, passes upwardly through the baffle chamber, the baffles 26 serving to intercept any pulp being carried over with the steam and to return it to the cyclone 12. There is thus no loss of pulp due to being carried over by the steam. Surrounding the baffle chamber 24, is a manifold 28 having a lateral connection 29. The wall 30 is perforated as shown at 31, within the manifold 28, whereby liquor or steam may be admitted when required through the connection 29 and pass through the perforations and over the baffles to wash and remove any accumulation of pulp thereon.

The blow tank 13, as shown in Fig. 3, comprises a cylindrical inner shell 33, made of steel plate which is provided with a conical bottom 34. At the bottom is an opening 36, through which the pulp is discharged. The inner shell 33, is perforated for approximately three-fourths of its height from the bottom with relatively large perforations 37. Fitting within the shell 33, are relatively thin gauge plates 38, having relatively fine perforations, forming a screen. These plates are preferably made removable by any suitable means, not shown, whereby they may be changed when required. The upper end of the inner shell 33, has connected thereto a conduit 39, leading to a safety valve 41, for the relief of excess pressure within the inner shell. Also, at 42 is shown a conduit leading to a pressure gauge 43. After the digester is blown and the inner shell is full, pressure accumulates due to the contained heat of the liquor and pulp. This pressure aids in draining the liquor from the pulp through the screens. The connection to the cyclone 12, is made by means of a frusto-conical outlet connection 44, terminating in a flanged opening 46, which connects with the flanged outlet 21 of the cyclone. This frusto-conical connection 44 aids in distributing evenly the incoming pulp around the inner shell and in throwing out liquor. Surrounding the lower perforated portion of the inner shell 33 is an outer shell 47 having its upper end joined to the inner shell at 48, as by welding. The outer shell 47 is generally cylindrical in shape and is connected to the storage tank 14 by means of a flanged connection 49. At 51 I show a manifold extending vertically alongside the outer shell 47, and connected to the manifold are a plurality of conduits 52, 53, 54, 56, 57, 58, 59, and 61. The conduits 52, 54, 57, 59 and 61 extend through the inner shell 33, and connect to headers 62 which lie closely adjacent the inner wall of the shell 33 and are provided with downwardly directed jets 63, through which liquor, as desired, may be discharged. The conduits 53, 56 and 58 terminate in headers 64 which surround the outside of the inner shell 33, lying closely adjacent thereto, and are provided with downwardly directed jets 66.

Figure 5:
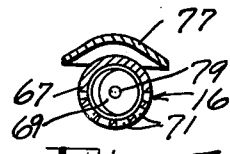
Fig. 5 is a sectional view taken along the line V—V of Fig 3.
Figure 6:
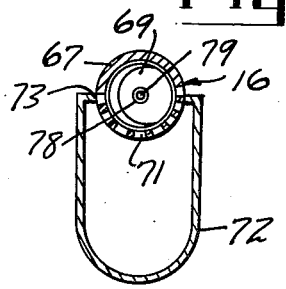
Fig. 6 is a sectional view taken along the line VI—VI of Fig. 3.

Connected to the discharge opening 36 at the lower end of the conical bottom 34 is an upwardly inclined trough or jacket 67 for a screw conveyor having a tapered screw 69 which increases in diameter from the lower end where the conveyor connects to the discharge opening to its upper, discharge end. The lower half of the trough 67 is provided with perforations 71, through which black liquor removed from the pulp by the action of the conveyor, drains downwardly into the storage tank 14. Outside the shell 47 there is an outer housing 72, which is joined to the trough 67, at 73, above the perforations 71. See Fig. 6. The housing 72, is connected by means of a flanged connection 74 to the outer shell 47, and communicates with the inner shell 47, through an opening 76. Inside the shell 47, the trough 67 is provided with a cover 77 which sheds any black liquor falling downwardly from the conical bottom 34, above it. See Fig. 5. The screw 69 is mounted on a hollow sleeve 78, which is mounted on a shaft 79. Steam may be admitted to the sleeve 78 through a rotary steam joint 80. Steam admitted through the joint 80 passes into the sleeve and from thence is diffused through the perforations into the pulp within the conveyor trough 67. The conveyor is driven by means of a variable speed motor 81, and a suitable train of gearing 82.

The upwardly inclined conveyor trough 67 is provided with a discharge outlet 83, which communicates with the trough 84 of a horizontally disposed screw conveyor. The trough 84 communicates with the upper end of the housing 72, and is provided with perforations 86, so that liquor separated from the pulp in the horizontal conveyor may drain into the housing 72. The horizontal conveyor is provided with a tapered screw 87, which gradually increases in diameter from its connection to the inclined conveyor toward the discharge end. The screw 87 is driven by means of a shaft 88, having mounted thereon or surrounding which, is a perforated sleeve 89. Steam admitted through the sleeve 89, as already described, is diffused into the pulp being handled by the conveyor. Connected to the lower half of the housing, or trough 84, is a housing 91, similar to the housing 72, for the inclined conveyor, and which connects to an opening into the housing 72. The housing 91, is joined to the trough 84, above the perforations 86, as shown in Fig. 10, whereby to form a pressure-tight structure. The shaft 88 is driven by a variable speed motor 92, similar to the motor 81, through suitable gearing 93.

The trough 84 of the horizontal conveyor discharges through an opening into a receptacle 94, in position to be picked up by a vertically disposed conveyor which conveys it upwardly. The receptacle 94 is provided with a perforated bottom and drains into the housing 91. The vertically disposed conveyor is provided with a tapered screw 97 similar to the screws described in connection with the other conveyors and increases in diameter from the lower to the upper discharge end. Surrounding the screw 97 is a perforated jacket 99 through which liquor is discharged into a surrounding imperforate housing 101 and passes downwardly through a lateral conduit 100 into the housing 91. The housing 101 is joined at its upper end at 102 with a fluid tight connection to the jacket 99. The pulp is finally discharged from the upper end of the vertical conveyor through a discharge opening 103, from whence it may be conveyed in any suitable manner for further processing as is well understood. The vertical conveyor, similarly to the upwardly inclined and horizontal conveyors, is driven by a separate variable speed motor 104, through suitable gearing 106.

All of the liquor removed from the pulp in my improved blow tank, drains downwardly into the storage tank 14. The latter is provided with a heating coil 107, supplied with steam from any suitable source through a connection 108. The liquor is thus maintained in a free flowing, non viscous condition. Condensate is removed from the coil 107 through a trap 109. Liquor drained into the storage tank 14 is removed by means of a pump 111, which discharges through a conduit 112. A strainer 110 is preferably interposed between the tank 14 and the pump 111. As is well understood, the black liquor is then filtered and evaporated down to the proper density for burning.

When the apparatus is shut down it is desirable that the inner shell be thoroughly washed of any retained fiber. For that purpose I show a conduit 113 connected to the discharge conduit 112. By opening a valve 114 in the conduit 113 and closing a valve 115 in the conduit 112, black liquor is delivered to the manifold 51 and is discharged through the nozzles 63 and 66 against the inner and outer sides of the inner shell 33.

The manifold 51 is provided with a steam supply through a steam supply conduit 116, whereby steam may be employed with the black liquor, or alone, in cleaning out the system. At the upper end of the manifold 51, I provide a valve 117, connected to a conduit 118, which leads to the connection 29, on the manifold 28. A check valve 119 adjacent the connection 29 prevents the blowing back of steam when the digestor is being discharged into the blow tank. Black liquor from the conduit 113, together with steam from the conduit 116 may be admitted into the manifold 51 through the valve 114 and from thence through the conduit 118 and perforations 31 to clean the baffles 26 as already described.

From the foregoing description, the operation of my improved apparatus will be readily understood. The contents of the digester 10, at the end of a cook, and consisting of black liquor under pressure, with the batch of chips, is blown through the blow line 11 into the cyclone 12 where the steam is separated from the liquor and pulp and passes out through the discharge conduit 27. Any pulp in the steam is separated out by means of the baffles 26 in the baffle chamber 24. The black liquor and pulp pass downwardly with a whirling motion through the trap valves 22 and 23 into the inner shell 33 where it is evenly distributed about the shell. The black liquor passes out through the screened, perforated lower end of the inner shell and drains downwardly into the storage tank 14. When the inner shell is full, above the perforations, steam accumulates above the mass and aids in forcing the black liquor out through the perforations.

The pulp settles by gravity into the lower end of the conical bottom 34, and passes into the lower end of the upwardly inclined conveyor trough 67, and is conveyed upwardly therefrom by the tapered conveyor screw and is discharged into the horizontal conveyor trough 84. From thence it is conveyed horizontally to the vertical conveyor housing and is then carried upwardly to be discharged through the discharge chute 103. In its passage through the conveyors, saturated steam at a temperature of from 250° to 280° F. is diffused through the pulp by means of the perforated sleeves surrounding the shafts so that it is maintained in a heated condition at all times and the black liquor with its resins and lignins is forced out therefrom through the perforated troughs of the conveyors. The speed of the conveyors is regulated to provide the maximum recovery of black liquor from the pulp with a minimum expenditure of steam. By this means, I am enabled to separate from 85 to 90 per cent of the black liquor from the pulp without material dilution. The steam diffused through the pulp is in part condensed, providing a small amount of liquid which aids the steam pressure in forcing the black liquor and suspended solids from the pulp. In my improved method there is no foaming in the separation of the liquor due to the absence of added water and agitation. I thus avoid the addition of anti-foaming agents which weaken the fiber and are expensive. In actual practice I have found that black liquor after separating from the pulp in accordance with my invention hereinbefore described and with all necessary wash water added has a specific gravity of from 13° to 18° Bé. as compared with a specific gravity of from 3° to 7° Bé. when separated by prior art methods. It thus requires around 40 per cent less heat to evaporate it down to a consistency suitable for burning and recovery of the chemicals therein.

The inner surfaces of the perforated troughs 67, 84 and 97 may be provided with finely perforated linings 120 to further aid in retaining the pulp in the troughs while being operated upon by the conveyors.

From the foregoing, it will be apparent that I have devised an improved apparatus for the separation of cooking liquor from pulp in the manufacture of paper in which the cooking liquor is separated with a minimum of dilution.

While I have shown my invention in but one form, it will be obvious to those skilled in the art that it is not so limited but that it is susceptible of various changes and modifications without departing from the spirit thereof, and I desire, therefore, that only such limitations shall be placed thereupon as are specifically set forth in the appended claims.

What I claim is:

1. A pulp and cooking liquor blow pit assembly comprising an inner compartment having a perforated, screen-covered wall portion with an inverted conical bottom section having a pulp and liquor discharge outlet at its bottom, means to feed cooking liquor and pulp into the upper end of said compartment, an outer shell spaced away from and enclosing at least the perforated portion of said compartment, a tapered screw conveyor having its inlet positioned to receive liquor-soaked pulp from said discharge outlet and its conveying screw increasing in diameter from the inlet to discharge end, said conveyor extending through the outer shell for removing such pulp from the conical bottom discharge outlet to exterior of the outer shell, said conveyor having a perforated trough and a housing at least under the trough for receiving liquor draining through the latter, said trough communicating with the interior of the outer shell so that the liquor draining into the trough flows into the inside of the outer shell.

2. Apparatus as defined in claim 1 together with steam distributing means within the conveyor to diffuse steam through the pulp as the cooking liquor is being separated therefrom.

3. Apparatus of the character described comprising an inner vessel having a conical screened bottom with a pulp discharge outlet in the bottom, means to discharge cooking liquor and pulp into the upper end of the inner vessel, an outer shell surrounding the inner vessel, spray nozzles disposed around the outside and inside of the inner vessel, steam and liquor connections to the spray nozzles, a screw conveyor extending through the outer shell for removing pulp from the discharge opening, a closed housing for the conveyor outside the outer shell and draining into the outer shell, a second screw conveyor disposed to receive the pulp from the first mentioned conveyor, a closed housing for the second conveyor draining into the first mentioned housing, a tapered screw for each of said conveyors increasing in diameter from inlet to discharge end, a perforated trough for each of said screws, means to inject steam into the pulp during its travel through said troughs, and a separate means to drive said conveyors at selected speeds.

4. In a paper mill, a blow tank assembly comprising an inner vessel having a conical screened bottom with a pulp discharge outlet in the bottom, means to discharge cooking liquor and pulp into the upper end of the inner vessel, an outer shell surrounding the inner vessel, a plurality of screw conveyors arranged in series, the first of said conveyors being disposed to remove pulp from the lower end of the inner vessel and to discharge it outside the outer shell and the succeeding conveyors to receive the pulp outside the outer shell and finally discharge it, a tapered screw for each of said conveyors increasing in diameter from inlet to discharge end, a perforated trough for each of said conveyors, means to diffuse steam through the pulp while intransit in said conveyors, communicating housings for the conveyors draining into the outer shell, and a separate means to drive the conveyors at selected speeds.

5. Apparatus as defined in claim 4 in which the means to diffuse steam through the pulp comprises a hollow perforated conveyor shaft with a steam connection at its outer end.

6. In a blow pit assembly, a screened bottom, a pulp discharge outlet in said bottom, a plurality of screw conveyors arranged in a series leading from said bottom discharge outlet with the latter feeding into the inlet of the first of the conveyors, each of said screw conveyors including a perforated trough, each of said screw conveyors having a significant increase in diameter from its inlet to discharge end, means for driving said screw conveyors at individually selected speeds and means for diffusing steam through the pulp in and along each of said screw conveyors.

7. In a blow pit assembly, a conical screened bottom, a pulp discharge outlet in said bottom, a plurality of screw conveyors arranged in a series leading from said bottom discharge outlet with the latter feeding into the inlet of the first of the conveyors, each of said screw conveyors including a perforated trough, each of said screw conveyors having a significant increase in diameter from its inlet to discharge end, means for driving said screw conveyors at individually selected speeds, the screw in each of said screw conveyors having a hollow shaft perforated within and along the conveyor, and means for injecting steam into each of said shafts.

8. In a blow pit assembly, a conical bottom, a pulp discharge outlet in said bottom, a plurality of screw conveyors arranged in a series leading from said bottom discharge outlet with the latter feeding into the inlet of the first of the conveyors, each of said screw conveyors including a perforated trough, each of said screw conveyors having a significant increase in diameter from its inlet to discharge end, separate means for driving each of said screw conveyors at individually selected speeds, the screw in each of said screw conveyors having a hollow shaft perforated within and along the conveyor, and means for injecting steam into each of said shafts at the larger diameter ends of said screws.

9. A pulp and cooking liquor blow tank assembly comprising a cylindrical compartment for receiving a mixture of pulp and cooking liquor and having a perforated, screen-covered wall portion with an inverted conical bottom section, an outer shell spaced away from and surrounding at least the perforated portion of said compartment, a storage tank communicating with, and positioned below, said outer shell and for receiving liquor draining through the perforated, screen portion, a screw conveyor having its inlet end positioned for receiving liquor soaked pulp from the bottom of said compartment to remove said pulp therefrom and having the diameter of its screw progressively increasing from the inlet to discharge end and including a perforated trough so arranged that liquor draining out of the pulp flows into the interior of the outer shell and the storage tank, and means to remove cooking liquor from the tank.

10. Apparatus for separating pulp from cooking liquor, in the manufacture of paper, comprising a blow tank having an inlet permitting the entry of a mixture of pulp and cooking liquor into it and having an inverted conical lower end sufficiently permeable to allow liquor to drain through it and yet to hold back liquor-soaked pulp, a screw conveyor having its inlet end positioned to receive such pulp from the lower end of the blow tank and the diameter of the screw progressively increasing from the inlet to the discharge end of the conveyor, a perforated trough for the conveyor screw to revolve in and for liquor to drain through the perforations, and a steam distributor within the conveyor to diffuse steam through the plup along the conveyor and its trough, the perforations in the trough being located at least in its lower part and under at least some part of the conveyor screw.

11. In combination with a blow pit having a pulp discharge outlet at its bottom, a tapered screw conveyor comprising a conveyor screw and a trough for the screw to rotate in and having its inlet communicating with the blow pit discharge outlet, perforations at least in the lower part of the trough and under at least part of the screw, the screw and its said trough having a significantly greater diameter at their discharge end than at the inlet end and increasing in diameter from the inlet to the discharge end, and means for diffusing steam through the pulp in and along said conveyor screw.

12. A combination with a blow pit as claimed in claim 11, wherein the screw of the conveyor has a holow perforated shaft within and along the conveyor, and the means for diffusing steam through the pulp is associated with the perforated shaft at the larger diameter end of the conveyor whereby the steam is injected into the shaft at that end.

PAUL G. von HILDEBRANDT.

REFERENCES CITED

The following references are of record in the file of this patent:

UNITED STATES PATENTS

| Number | Name | Date |
| --- | --- | --- |
| 604,348 | Bussells | May 17, 1898 |
| 848,484 | Newnham | Mar. 26, 1907 |
| 850,384 | Mallam | Apr. 16, 1907 |
| 1,505,934 | Olier | Aug. 19, 1924 |
| 1,676,459 | Plate | July 10, 1928 |
| 1,860,836 | Gustin | May 31, 1932 |
| 1,915,812 | Wollenberg | June 27, 1933 |
| 1,933,609 | Wagner | Nov. 7, 1933 |
| 1,991,244 | De La Roza | Feb. 12, 1935 |
| 2,013,115 | Thorne | Sept. 3, 1935 |
| 2,342,225 | Schnyder | Feb. 22, 1944 |
| 2,355,091 | McDonald | Aug. 8, 1944 |
| 2,383,684 | Richter | Aug. 28, 1945 |
| 2,396,587 | Lowgren | Mar. 12, 1946 |

FOREIGN PATENTS

| Number | Country | Date |
| --- | --- | --- |
| 416,600 | Germany | July 22, 1925 |
| 2,233 | Great Britain | of 1886 |
| 422,530 | Great Britain | Jan. 14, 1935 |
| 69,597 | Sweden | Feb. 26, 1926 |
| 91,969 | Sweden | Apr. 8, 1938 |